US012423060B2

United States Patent
Sumeet et al.

(10) Patent No.: US 12,423,060 B2
(45) Date of Patent: Sep. 23, 2025

(54) METHOD AND SYSTEM FOR NON-INTRUSIVE PROFILING OF HIGH-LEVEL SYNTHESIS (HLS) BASED APPLICATIONS

(71) Applicant: Tata Consultancy Services Limited, Mumbai (IN)

(72) Inventors: Nupur Sumeet, Thane West (IN); Manoj Karunakaran Nambiar, Thane West (IN); Deeksha Kashyap, New Delhi (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 361 days.

(21) Appl. No.: 18/086,248

(22) Filed: Dec. 21, 2022

(65) Prior Publication Data
US 2023/0305814 A1 Sep. 28, 2023

(30) Foreign Application Priority Data
Mar. 25, 2022 (IN) .............................. 20222101711.1

(51) Int. Cl.
*G06F 8/20* (2018.01)
(52) U.S. Cl.
CPC ...................................... *G06F 8/20* (2013.01)
(58) Field of Classification Search
CPC . G06F 30/20; G06F 30/33; G06F 8/41; G06F 11/3409; G06F 11/3466
See application file for complete search history.

(56) References Cited

U.S. PATENT DOCUMENTS

| | | | |
|---|---|---|---|
| 2015/0278078 A1* | 10/2015 | Kawamura | G06F 8/45 717/130 |
| 2019/0095566 A1* | 3/2019 | Denisenko | G06F 30/343 |
| 2019/0102500 A1* | 4/2019 | Sinclair | G06F 8/4434 |
| 2022/0147675 A1* | 5/2022 | Siracusa | G06F 30/343 |

OTHER PUBLICATIONS

Aldham et al., "Low-Cost Hardware Profiling of Run-Time and Energy in FPGA Embedded Processors," (2011).
Awadalla et al., "Real-Time Software Profiler for Embedded Systems," International Journal of Soft Computing and Engineering (IJSCE), 3(1) (2013).

* cited by examiner

*Primary Examiner* — Duy Khuong T Nguyen
(74) *Attorney, Agent, or Firm* — Finnegan, Henderson, Farabow, Garrett & Dunner, LLP

(57) ABSTRACT

State of the art techniques provide dedicated High-Level Synthesis (HLS) performance estimator tools that can give insights on performance bottlenecks, stall rate, stall cause etc., in HLS designs. These estimators often limit themselves to simple loop topologies and limited pragma use which makes them unreliable for large designs with complex datapaths. Embodiments herein provide a method and system for non-intrusive profiling for high-level synthesis HLS based applications. The method provides a cycle-accurate, fine-grained performance profiling framework that is non-intrusive and provides an end-to-end profile of the design. Such profiling tool can help the designer/DSE tool to quickly identify the performance bottlenecks and have a guided approach towards tuning it.

7 Claims, 5 Drawing Sheets

METHOD AND SYSTEM FOR NON-INTRUSIVE PROFILING OF HIGH-LEVEL SYNTHESIS (HLS) BASED APPLICATIONS

PRIORITY CLAIM

This U.S. patent application claims priority under 35 U.S.C. § 119 to: Indian Patent Application No. 202221017111, filed on Mar. 25, 2022. The entire contents of the aforementioned application are incorporated herein by reference.

TECHNICAL FIELD

The embodiments herein generally relate to High-Level Synthesis (HLS) profiling and, more particularly, to a method and system for non-intrusive profiling of High-Level Synthesis (HLS) based applications.

BACKGROUND

Performance profilers are software development tools designed to assist in performance analysis of applications and improve poorly performing sections of a code. They provide measurements on time taken by a routine to execute, proportion of total time spent on it, its parent routine etc. Performance profiling are quite common practices in software paradigm as matured profiling tools are available. However, it is not the case in hardware development, mainly Field Programmable Gate Arrays (FPGAs). FPGAs are becoming a popular choice as an application accelerator due to its support for deep pipelines as well as low latency realizations. The datapath based design in FPGAs is favorable to performance sensitive applications. The traditional hardware development encompasses coding the design in Hardware Description Languages (HDLs), such as Verilog and Very High Speed Integrated Circuit (VHSIC) Hardware Description Language (VHDL) and define the Register Transfer Logic (RTL) datapath from input to output and achieve the desired functionality. A recent approach for hardware design development is through High Level Synthesis (HLS) tools. With HLS, the design development productivity improves as it supports high-level languages (C/C++) and the process of creating HDL description, defining RTL datapath, operation scheduling etc. are abstracted away from the developer.

The HLS development flow includes HLS compiler for generating HDL description of source code and include co-simulation for cycle-accurate functional analysis. It should be noted that HLS development requires an additional step of implementation to generate the FPGA executable. Although the HLS development flow provides a simplified, faster, and highly abstracted way for hardware design developments, often, better parallel or pipelined algorithms may be designed which are better suited to the FPGA architecture. The special directives (e.g., #pragma in Xilinx HLS tools) available in HLS tools help in design space exploration to improve the design micro-architecture and FPGA hardware matching, but their efficient use depends on the programming abilities and experience of the developer. However, as is the case in software design, the performance profile of hardware design can help identify the performance bottlenecks and aid the developer in fine-tuning the design performance. Vivado HLS™ and Intel HLS™ are popular HLS tools used in industry. These HLS tools provide the overall latency of the source code along with the cycle-count at the loop or sub-function level but the cycle accounting for every line of source code is not available. Though, it is possible to relate the synthesized HDL to clock cycles through waveforms but associating the source code statements to the synthesized HDL is not straight-forward, since a single C statement can be expressed as multiple HDL signals triggering one another while being spread across multiple clock cycles.

The missing correspondence between source-code and performance information can be addressed by line-by-line profiling. This concept is not new and is available in software through tools like Gprof™. The performance profilers can outline how much time has been spent in each line of code. However, this information is difficult to obtain for highly-parallel superscalar-like architectures. Additionally, it is normal for one line of source code to translate into many lines of assembly instructions, that can be scheduled with out of order parallelism. Depending on the ISA scheduling, it is possible that more than one lines of code are executing in a single clock cycle. However, works in literature indicate that existing profiling tools are intrusive in nature and often introduce performance overheads. This is because of the additional profiling instructions that are added in the compiled application code to collect the required data. Apart from profiling tools, use of 'print' statements in software is a common method used to collect profile data.

On hardware platforms like FPGA, HLS_Print Framework™ can be used to derive profiling information. Similar to other profiling framework, HLS_Print is intrusive in nature and introduces additional circuitry in the application. Moreover, it requires the time-consuming implementation followed by programming the FPGA and application test on hardware. On hardware platforms like FPGA, this is a step can be avoided since cycle accurate simulators are available. The design signal waveforms can be viewed in the simulator to estimate the profile of the application. The signals are part of the RTL design that is generated by the HLS compiler.

SUMMARY

Embodiments of the present disclosure present technological improvements as solutions to one or more of the above-mentioned technical problems recognized by the inventors in conventional systems.

For example, in one embodiment, a method for non-intrusive profiling of High-Level Synthesis (HLS) based applications is provided. The method includes synthesizing a design for a source code for an HLS based application using an HLS compiler, in accordance with a synthesis time period, wherein the design is specified by the HLS compiler in terms of a plurality of hardware description language (HDL) files, a synthesis report, a verbose binding report and a plurality of database files. Further, the method includes co-simulating the design of the plurality of HDL files using a co-simulator, based on a test bench identified for the source code to generate a Value Change Dump (VCD) file comprising a plurality of HDL signals in the plurality of HDL files cycle-by-cycle and a corresponding plurality of HDL signal values for an entire execution time at every time instant with a plurality of commands. Further, the method includes extracting structured information using an HLS profiler by: (a) parsing the VCD file to generate a timing information for the plurality of HDL signals from the plurality of HDL files with the corresponding plurality of HDL signal values; (b) parsing the synthesis report to generate a plurality of module names to which the plurality of HDL signals belong and a corresponding plurality of source code functions; (c) parsing the verbose binding report to link an initial name to an HDL signal name for each of the plurality of HDL signals; (d) parsing the plurality of HDL files to obtain whether the HDL signal name, associated with each of the plurality of HDL signals, is one of a wire and a register; (e) parsing the source code to record a plurality of variables, a plurality of array variables, a precision data type status, and a multiplication status at a line number for each of a plurality of code lines of the source code; and (f) parsing the plurality of database files to link the initial name for each of the HDL signals to the plurality of variables in the source code. Furthermore, the method includes analyzing using the HLS profiler, the extracted structured information in accordance with one or more rules from a set of associative rules to define associations between the line number of the source code, the plurality of variables, the HDL signal name for each of the plurality of HDL signals and the corresponding plurality of HDL signal values providing visibility into cycle-by-cycle hardware execution of the source-code for entire HLS based application execution time to generate a performance profile table for the source code. The set of associative rules are based on source code semantics, parsed output corresponding to the extracted structured information and HDL design semantics and enable suppress invalid transitions getting captured in standard HLS profiling.

In another aspect, a system for non-intrusive profiling of High-Level Synthesis (HLS) based applications is provided. The system comprises a memory storing instructions; one or more Input/Output (I/O) interfaces; and one or more hardware processors coupled to the memory via the one or more I/O interfaces, wherein the one or more hardware processors are configured by the instructions to synthesize a design for a source code for an HLS based application using an HLS compiler, in accordance with a synthesis time period, wherein the design is specified by the HLS compiler in terms of a plurality of hardware description language (HDL) files, a synthesis report, a verbose binding report and a plurality of database files. Further, the one or more hardware processors are configured to co-simulating the design of the plurality of HDL files using a co-simulator, based on a test bench identified for the source code to generate a Value Change Dump (VCD) file comprising a plurality of HDL signals in the plurality of HDL files cycle-by-cycle and a corresponding plurality of HDL signal values for an entire execution time at every time instant with a plurality of commands. Further, the one or more hardware processors are configured to extract structured information using an HLS profiler by: (a) parsing the VCD file to generate a timing information for the plurality of HDL signals from the plurality of HDL files with the corresponding plurality of HDL signal values; (b) parsing the synthesis report to generate a plurality of module names to which the plurality of HDL signals belong and a corresponding plurality of source code functions; (c) parsing the verbose binding report to link an initial name to an HDL signal name for each of the plurality of HDL signals; (d) parsing the plurality of HDL files to obtain whether the HDL signal name, associated with each of the plurality of HDL signals, is one of a wire and a register; (e) parsing the source code to record a plurality of variables, a plurality of array variables, a precision data type status, and a multiplication status at a line number for each of a plurality of code lines of the source code; and (f) parsing the plurality of database files to link the initial name for each of the HDL signals to the plurality of variables in the source code. Furthermore, the one or more hardware processors are configured to analyze using the HLS profiler, the extracted structured information in accordance with one or more rules from a set of associative rules to define associations between the line number of the source code, the plurality of variables, the HDL signal name for each of the plurality of HDL signals and the corresponding plurality of HDL signal values providing visibility into cycle-by-cycle hardware execution of the source-code for entire HLS based application execution time to generate a performance profile table for the source code. The set of associative rules are based on source code semantics, parsed output corresponding to the extracted structured information and HDL design semantics and enable suppress invalid transitions getting captured in standard HLS profiling.

In yet another aspect, there are provided one or more non-transitory machine-readable information storage mediums comprising one or more instructions, which when executed by one or more hardware processors causes a method for non-intrusive profiling of High-Level Synthesis (HLS) based applications. The method includes synthesizing a design for a source code for an HLS based application using an HLS compiler, in accordance with a synthesis time period, wherein the design is specified by the HLS compiler in terms of a plurality of hardware description language (HDL) files, a synthesis report, a verbose binding report and a plurality of database files. Further, the method includes co-simulating the design of the plurality of HDL files using a co-simulator, based on a test bench identified for the source code to generate a Value Change Dump (VCD) file comprising a plurality of HDL signals in the plurality of HDL files cycle-by-cycle and a corresponding plurality of HDL signal values for an entire execution time at every time instant with a plurality of commands. Further, the method includes extracting structured information using an HLS profiler by: (a) parsing the VCD file to generate a timing information for the plurality of HDL signals from the plurality of HDL files with the corresponding plurality of HDL signal values; (b) parsing the synthesis report to generate a plurality of module names to which the plurality of HDL signals belong and a corresponding plurality of source code functions; (c) parsing the verbose binding report to link an initial name to an HDL signal name for each of the plurality of HDL signals; (d) parsing the plurality of HDL files to obtain whether the HDL signal name, associated with each of the plurality of HDL signals, is one of a wire and a register; (e) parsing the source code to record a plurality of variables, a plurality of array variables, a precision data type status, and a multiplication status at a line number for each of a plurality of code lines of the source code; and (f) parsing the plurality of database files to link the initial name for each of the HDL signals to the plurality of variables in the source code. Furthermore, the method includes analyzing using the HLS profiler, the extracted structured information in accordance with one or more rules from a set of associative rules to define associations between the line number of the source code, the plurality of variables, the HDL signal name for each of the plurality of HDL signals and the corresponding plurality of HDL signal values providing visibility into cycle-by-cycle hardware execution of the source-code for entire HLS based application execution time to generate a performance profile table for the source code. The set of associative rules are based on source code semantics, parsed output corresponding to the extracted structured information and HDL design semantics and enable suppress invalid transitions getting captured in standard HLS profiling.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

Figure 1A:
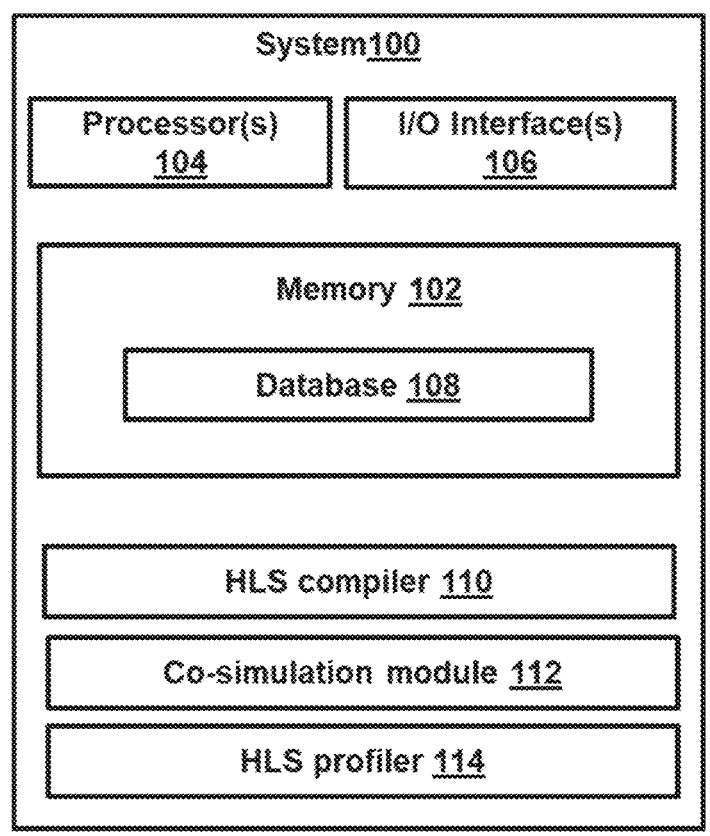
FIG. 1A is a functional block diagram of a system, for non-intrusive profiling of High-Level Synthesis (HLS) based applications, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Code profiling entails dynamic program analysis that captures code execution statistics including space (memory) or time complexity, frequency, and duration of function calls etc. The profiling information aids in program optimization and is commonly achieved by instrumenting either the program source code or its binary executable form using profiler tools. The output of the profiler tools can be a statistical summary of the code with profiling data (for example # of times a line of code is executed) annotated against the source code. On the other hand, performance issues in parallel programs often depend on the time relationship of events and thus require a full trace of code execution. Profiler tools work on the principle of sampling and instrumentation where the former supports low-profiling granularity as compared to the latter. A sampling profiler probes the program call stack at regular intervals using interrupts. Sampling profiles are less numerically accurate and specific but allow the target program to run at near full speed. Instrumentation technique effectively adds instructions to the target program to collect the profiling information. However, code instrumenting can cause performance changes, and may in some cases lead to inaccurate results. The instrumentation can be added manually or automatically at the source-code, intermediate-code or compiled executable level. Performance profile is an important instrument to efficiently explore the design space and systematically improve its performance. The challenges in relating the HLS code to a synthesized RTL design acts as a deterrent in analyzing the implementation performance when it comes to non-intrusive analysis. Moreover, control and branching statements add to the difficulty in performance evaluation based only on static information.

Thus, embodiments herein provide a non-intrusive profiling of High-Level Synthesis (HLS) based applications. The method combines static information with hardware signal waveforms to come up with approaches that could be used to profile the application actual execution on Field Programmable Gate Arrays (FPGA). The method formulates useful association rules that could help relate hardware signals and waveforms to the source code variables and line numbers. The association rules when incorporated into HLS profiler correctly profile all the diverse applications.

Referring now to the drawings, and more particularly to FIGS. 1A through 3B, where similar reference characters denote corresponding features consistently throughout the figures, there are shown preferred embodiments and these embodiments are described in the context of the following exemplary system and/or method.

FIG. 1A is a functional block diagram of a system 100, for non-intrusive profiling of High-Level Synthesis (HLS) based applications, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a plurality of modules (not shown) and a database 108 and the like. The database 108, may also store generated performance profile tables for a given source code. Further, the memory 102 may comprise information pertaining to input(s)/output(s) of each step performed by the processor(s) 104 of the system 100 and methods of the present disclosure. In an embodiment, the database 108 may be external (not shown) to the system 100 and coupled to the system via the I/O interface 106. Further, the system 100 includes functional blocks such as an HLS compiler 110, a co-simulator 112, and an HLS profiler 114.

Figure 1B:
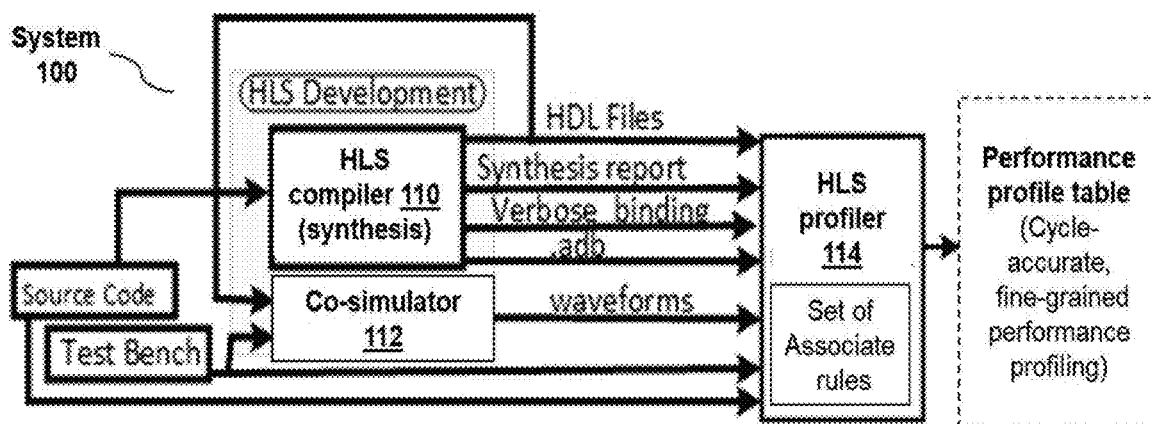
FIG. 1B depicts an overview of the system of FIG. 1A, in accordance with some embodiments of the present disclosure.

FIG. 1B depicts an overview of the system 100 of FIG. 1A with process flow between the HLS compiler 110, the co-simulator 112, the HLS profiler 114, in accordance with some embodiments of the present disclosure. As part of HLS synthesis, the HLS compiler 110, can be implemented via any available HLS compiler tools and platforms, which converts a source code of an HLS-based application, alternatively refereed herein after as application, developed in high-level language to low-level HDL implementation and by following three steps. 1) Scheduling 2) Binding, and 3) Control extraction. The logic operations are distributed through the clock cycles in scheduling and the number of such operations depends on the clock frequency, optimization directives and FPGA technology library. Binding assigns hardware resources for carrying out the logic operation which are scheduled using a state machine by the control extraction step.

The co-simulator 112 provides a C/RTL co-simulation that uses C test bench to automatically verify the RTL design. The HLS compiler 110 generates the input test vectors based on the C test bench and uses them for RTL simulation of the synthesized RTL. The RTL simulation output is stored as output vectors that are verified for correctness by the C test bench. The designer can review generated waveform from C/RTL co-simulation using a Wave Viewer to analyze the temporal changes of design RTL signals. The temporal changes of RTL signals can also be captured in form of a Value Change Dump (VCD) report. The VCD report contains the value of RTL or HDL signals at every time-stamps for entire simulation duration. The C/RTL co-simulation denotes the dynamic behavior of the design and depends on run-time value of the design variables.

To support profiling in HLS-based designs, the HLS profiler 114, also referred to as profiler framework, provides an automated and non-intrusive performance profiling tool that generates a cycle-by-cycle association to every line of source code (SC) for an entire HLS based application execution time. The HLS-profiler 114 based approach for profiling collects waveforms, source code and HDL files from HLS development flow along with verbose binding files, test bench, database files such as '.adb' files, and synthesis report files and translates it to profiling information as shown in FIG. 1B. Profiler framework is based on static analysis and dynamic trace, available from the HLS compilers, that is used along with associative rules to generate cycle-accurate profiles. The HLS compiler 110 generates the RTL equivalent of the C source code and represent the source code variable and RTL or HDL signal association in the form of static information. The dynamic behavior captured in form of RTL waveforms do not exhibit direct relation to C source code variables. This disconnect and technical limitation observed in the existing HLS development tools in the art acts as a deterrent to performance fine-tuning of HLS designs. Unlike the existing profiling tools, the HLS profiler 114 disclosed herein associates every line of C-source code to a clock cycle. The HLS profiler 114 uses reports generated by the HLS compiler 110 during synthesis and co-simulation and presents a fine-grained performance profile table of designs developed using HLS development tools. In addition to HLS compiler 110 generated reports, the HLS profiler 114 makes use of a set of associative rules to suppress invalid transitions that were otherwise getting captured in the performance profile.

Figure 2:
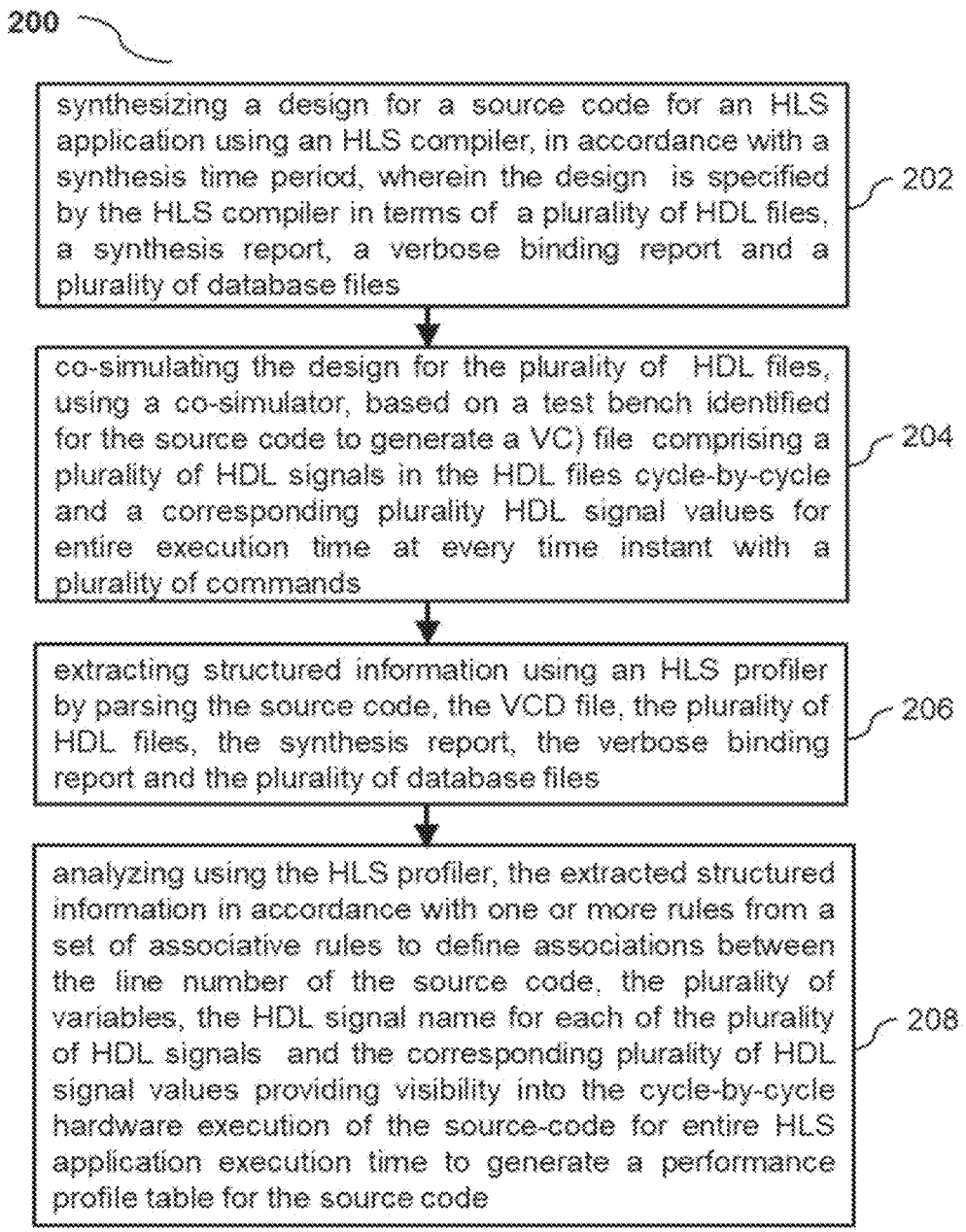
FIG. 2 is a flow diagram illustrating a method for non-intrusive profiling of High-Level Synthesis (HLS) based applications, using the system of FIG. 1B, in accordance with some embodiments of the present disclosure.

Functions of the components of the system 100 are explained in conjunction with flow diagram of FIG. 2 and example of FIG. 3.

Figure 3A:
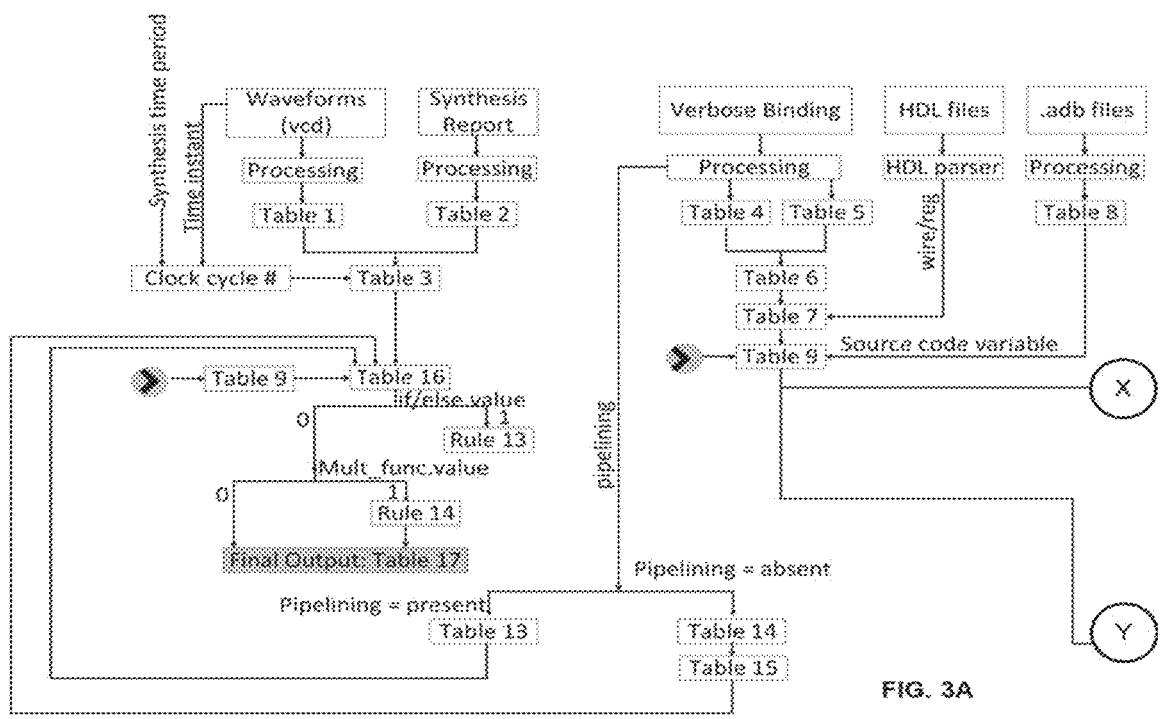
FIGS. 3A and 3B (collectively referred as FIG. 3) depict an architecture of an HLS profiler of the system of FIG. 1B, in accordance with some embodiments of the present disclosure.
Figure 3B:
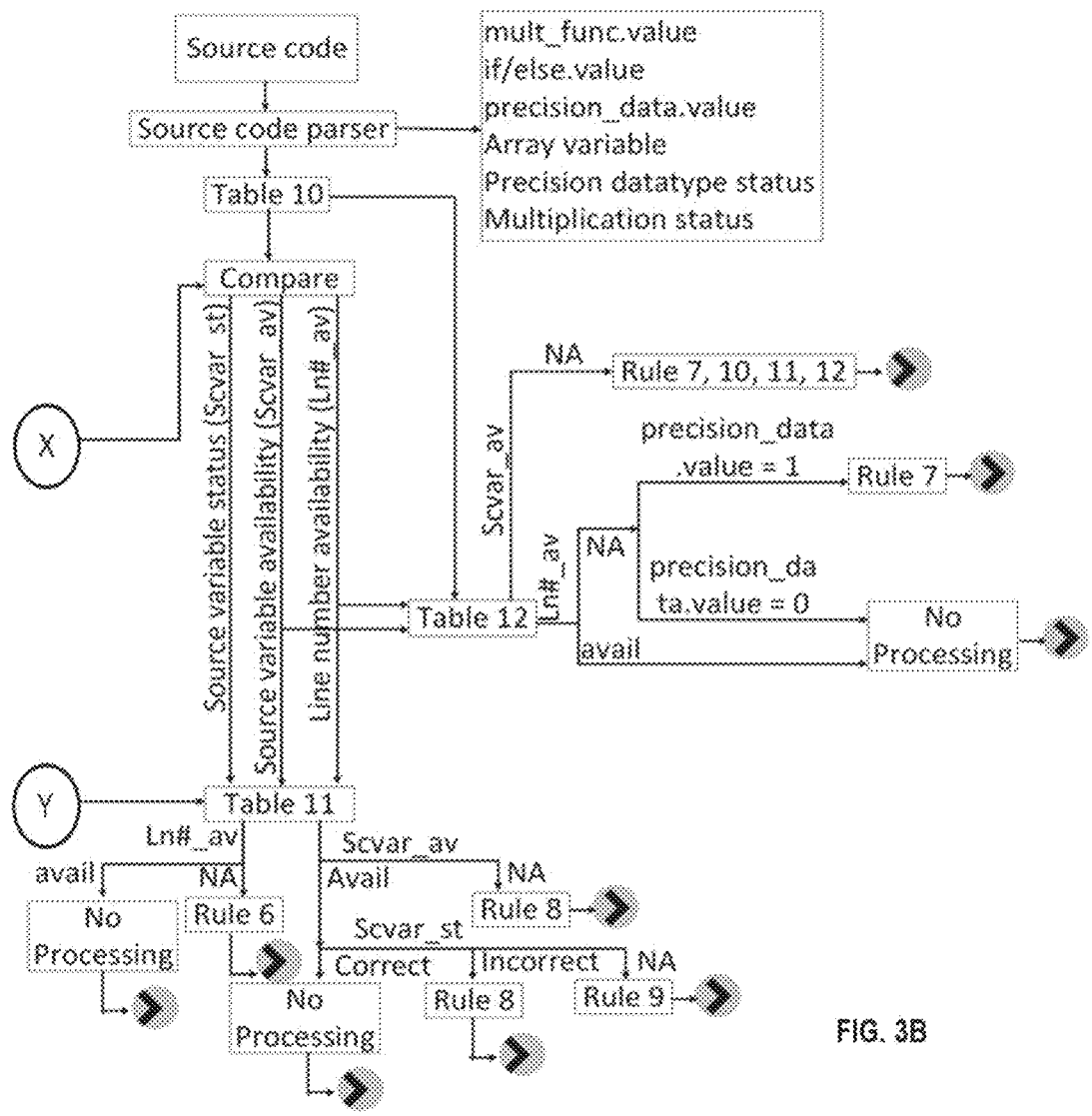

FIG. 2 is a flow diagram illustrating a method 200 for non-intrusive profiling of High-Level Synthesis (HLS) based applications, using the system of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s)

or one or more hardware processors 104 using the HLS compiler 110, co-simulator 112, and the HLS profiler 114. The steps of the method 200 of the present disclosure will now be explained with reference to the components or blocks of the system 100 as depicted in FIGS. 1A and 1B and the steps of flow diagram as depicted in FIG. 2, and an HLS profiler architecture of the system 100 of FIG. 1 as depicted in FIGS. 3A and 3B (collectively referred as FIG. 3). Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202 of the method 200, the one or more hardware processors 104, using the HLS compiler 110, synthesize a design (RTL design) for a source code received for an HLS based application (application), in accordance with a synthesis time period. The source can be a C-source code. The design is specified by the HLS compiler 110 in terms of a plurality of hardware description language (HDL) files, a synthesis report, a verbose binding report and a plurality of database files such as '.adb' files.

At step 204 of the method 200, the one or more hardware processors 104, using the co-simulator 112, co-simulate the design for the plurality of HDL files. The co-simulator utilizes the test bench (for example a C test bench) identified for the source code to generate the Value Change Dump (VCD) file comprising a plurality of HDL signals in the HDL files cycle-by-cycle and a corresponding plurality HDL signal values for entire execution time at every time instant with a plurality of commands.

At step 206 of the method 200, the one or more hardware processors 104, using the HLS profiler 114, extract structured information by parsing the plurality of hardware description language (HDL) files, the synthesis report, the verbose binding report, and the plurality of .adb files as explained in steps (a) to (f) below.
  a) Parse the VCD file to generate timing information for the plurality of HDL signals from the plurality of HDL files with the corresponding plurality of HDL signal values;
  b) Parse the synthesis report to generate a plurality of module names to which the plurality of HDL signals belong and a corresponding plurality of source code functions;
  c) Parse the verbose binding report to link an initial name to an HDL signal name for each of the plurality of HDL signals;
  d) Parse the plurality of HDL files to obtain whether the HDL signal name, associated with each of the plurality of HDL signals, is a wire or register;
  e) Parse the source code to record a plurality of variables, a plurality of array variables, precision data type status, and multiplication status at a line number for each of a plurality of code lines of the source code;
  f) Parse the plurality of .adb files to link the initial name for each of the HDL signals to the plurality of variables in the source code.

At step 208 of the method 200, the one or more hardware processors 104, using the HLS profiler 114, analyze the extracted structured information in accordance with one or more rules from a set of associative rules to define associations between the line number of the source code, the plurality of variables, the HDL signal name for each of the plurality of HDL signals and the corresponding plurality of HDL signal values providing visibility into the cycle-by-cycle hardware execution of the source-code for entire application execution time to generate the performance profile table for the source code. The set of associative rules are based on source code semantics, parsed output corresponding to the extracted structured information and HDL design semantics and enable suppress invalid transitions that get captured in standard HLS profiling. The set of associative rules comprise a first subset of rules among the set of associative rules that enable obtaining status at the line number level and a second subset of rules among set of associative rules that enable obtaining profile correctness in the performance profile table.

Once the performance profile table is generated it can be shared with a developer, who can tune the performance of the design using HLS profiler 114 using following steps as listed below:
Inputs: Source code, Test Bench, Synthesis Frequency and Top Function Name
  1. Run the HLS_Profiler script.
  2. Performance profile of the source code is available in a text file.
  3. Identify, optimize bottleneck, and update source code with appropriate pragma directive.
  4. Repeat Steps 1-3 till performance target is met.

FIGS. 3A and 3B (collectively referred as FIG. 3) depict the architecture of the HLS profiler 114 shown in the system 100 of FIG. 1, in accordance with some embodiments of the present disclosure.
Inputs: Source Code, Test Bench, Synthesis Time Period
Output: Cycle-by-Cycle Performance Profile
Step 1:
  Create HLS project using HLS development tools, Xilinx Vivado™ HLS or Xilinx Vitis™ HLS. Add source code and test bench to the project.
Step 2:
  Synthesize the design. Synthesis takes the source code and synthesis time period as inputs and generates the HDL (Verilog and VHDL) files of the source code. Synthesis also generates synthesis report, verbose binding and .adb files.
Step 3:
  Co-simulate the design. Co-simulation takes the HDL files of the source code and test bench as input and generates the timing behavior of all the signals in the HDL files of the source code cycle-by-cycle. The co-simulation information is dumped in the form of VCD (value change dump) file that contains all HDL signals from all HDL files and their signal value for entire execution time at every time instant with the following commands.
  1. restart
  2. open_vcd
  3 log_vcd
  4. run #entire execution time (ns)
  5. close_vcd
Step 4:
  Run VCDVCD parser, which is an open source file processing tool. VCDVCD parser takes the VCD file as input and generates the timing information for all HDL signals from all HDL files with their values. It also generates the module name to which HDL signals belong. The module is equivalent to source code function (Table 1). This is more like a data processing step for VCD file to give it a certain structure required by following processing steps.

TABLE 1 depicts table format

| Time Instant | Module Name | HDL signal name | HDL signal value |
|---|---|---|---|

Step 5:

Parse synthesis report to generate Table 2 with columns 'module name' and 'source code function' by searching 'instance' keyword in 'Utilization Estimates' section of synthesis report. Module is equivalent of Source code function in HDL.

TABLE 2 depicts table format

| Module Name | Source code function |
|---|---|

Step 6:

Merge Table 1 and Table 2 by comparing Table1. Module Name and Table2.Module Name to create Table 3.

In addition to Table 2 data, Table 3 contains source code function name for all HDL signals.

TABLE 3 depicts format

| Time Instant | Module Name | Source code function | HDL signal name | HDL signal value |
|---|---|---|---|---|

Step 7:

The signal transition records is deleted from Table 3 that occur at time instances other than rising edge of clock. For this, the "ap_clk" HDL signal is used. At the rising edge of clock, "ap_clk" HDL signal value is 1 else it is 0. Records with Signal transitions at the clock instance when ap_clk HDL signal is 0 are deleted from Table 3.

For the retained records, the time instants are converted to clock cycles number. For this, the time period provided during synthesis is used and the following formula.

Clock cycle #=(((time instant/(synthesis time period/2))−1)/2)+1

This clock cycle # information is added to the Table 3 entries as shown below.

TABLE 3 format (updated with clock cycle #)

| Time Instant | Clock cycle # | Module | Source code function | HDL signal name | HDL signal value |
|---|---|---|---|---|---|

Step 8:

The verbose binding report contains design states and sequence of operations active in a state. The sequence of operations are distributed among states (bind_states) by the HLS compiler during synthesis.

The operation record contains the target signal (in the form of initial name of HDL signal), the operator type, operands, predicate, and line numbers. The operands are the inputs of the operation and are available in the form of initial names of HDL signals. The predicate indicates the condition that needs to be satisfied for the target signal to attain the output of operation. The predicate contains either "TRUE" or a signal expression. When the predicate is "TRUE" or signal expression evaluates as "TRUE", the output of operation gets assigned to target signal otherwise the target signal is not updated. Line number indicates the source code line number for the target signal.

Parse the verbose binding report to record the target signals belonging to a particular state (state_bind) and their predicate, operation, operands, and line numbers. The signals here are indicated as initial_names and do not directly correspond to HDL signal names. This information is presented in tabular format (Table 4).

TABLE 4 format and an example.

| state_bind # | initial_name | operator | operands | predicate | Line number |
|---|---|---|---|---|---|
| 2 | i | add | i_0, 1 | true | 3 |

Step 9:

Parse the verbose binding report to link the initial_name to HDL signal name. For every initial_name the verbose binding report contains the HDL signal name. This information is presented in tabular format (Table 5).

TABLE 5 format and an example.

| Initial_name | HDL signal name |
|---|---|
| i | i_fu_142 |

Step 10:

Merge Table 4 and Table 5 to generate Table 6. In addition to Table 4 entries, Table 6 contains HDL signal name for every initial name.

TABLE 6 format and an example.

| state_bind # | HDL signal name | initial_ name | operator | operands | predicate | Line number |
|---|---|---|---|---|---|---|
| 2 | i_fu_142 | i | add | i_0, 1 | true | 3 |

Step 11:

Parse the HDL file to obtain whether HDL signal name is a wire or register. The 'type' information is added into Table 6 to generate Table 7.

TABLE 7 format and an example

| state_bind | HDL signal name | type (wire/ reg) | initial_name | operator | operands | predicate | Line number |
|---|---|---|---|---|---|---|---|
| 2 | i_fu_142 | wire | i | add | i_0, 1 | true | 3 |

Step 12:

Parse .adb file to link initial_names to source code variables. This information is presented in tabular format in Table 8.

TABLE 8 format and an example

| Initial_name | Source code variable |
|---|---|
| i | i |

Step 13:

Merge Table 7 and Table 8 to generate Table 9. The source code variable information is added into Table 7 to generate Table 9.

TABLE 9 format and an example

| state_bind | HDL signal name | type (wire/) reg | initial_name | Source code variable | operator | operands | predicate | Line number |
|---|---|---|---|---|---|---|---|---|
| 2 | i_fu_142 | wire | i | i | add | i_0, 1 | true | 3 |

Step 14:

Parse the source code to record the target source code variables, array variables, precision data type status and multiplication status at each line along with line numbers in Table 10.

Target source code variable holds the final variable at every line.

Array variables stores the source code variables whose data structure is array and present at right hand side of assignment ('=') operator. At any line, if square bracket i.e. [ ] is followed by any source code variable, then that source code variable is array, square brackets may be empty, or they might contain the size of array as some constant or variables.

If no array is present at any line then array variables hold 'NA' i.e., non-available value.

Precision data type status stores the status of lines i.e., whether the line includes variables with precision data type or not. If source code contains #ap_int.h or #ap_fixed.h library then assign precision_data.value=1 else precision_data.value=0. If precision_data.value==1 and any variable on any Line number is declared as precision data type i.e., of type ap_int or ap_fixed (and not standard data type (int, short, char, double, float)) then precision data type status on that line is TRUE else it is FALSE.

Multiplication status holds TRUE when multiplication operation i.e., '*' operator is used at any line else it is FALSE.

If 'if/else' condition is present in source code i.e., 'if' keyword at any line, then assign if/else.value=1 or if/else.value=0.

If multiple functions are defined in source code and Table 2 has more than 1 entry then assign mult_func.value=1 else mult_func.value=0.

mult_func.value=0 if/else.value=0 precision_data.value=0

TABLE 10 format and an example

| Line # | Line | source code variable | array variables | precision data type status | Multiplication status |
|---|---|---|---|---|---|
| 3 | outer:for(i=0;i<row_size;i++) { | i | NA | FALSE | FALSE |
| 4 | middle:for(j=0;j<col_size;j++) { | j | NA | FALSE | FALSE |
| 5 | i_col = i * col_size; | i_col | NA | FALSE | TRUE |
| 6 | double sum = 0; | sum | NA | FALSE | FALSE |
| 7 | inner:for(k=0;k<row_size;k++) { | k | NA | FALSE | FALSE |
| 8 | k_col = k * col_size; | k_col | NA | FALSE | TRUE |
| 19 | mult = m1[i_col + k] * m2[k_col + j]; | mult | m1, m2 | FALSE | TRUE |
| 10 | sum += mult;} | sum | NA | FALSE | FALSE |
| 11 | prod[i_col + j] = sum } } } | prod | NA | FALSE | FALSE |

Step 15:

Update Table 10 to Table 11 by adding line number availability status, line number status, source code variables availability status and source code variable status at every line of source code. One or more rules from an example set of associative rules mentioned below are used to obtain various status at line level. As can be understood the rules can be modified as per the requirements.

First Subset of Rules (for Obtaining Status at Line Level):

Rule 1: A Line number present in Table 10, if also present in line number column of Table 9 then Line number availability in Table 11 for the same is 'avail' else it is 'NA' i.e., non-available. The 'avail' or NA status is populated in Table 11.

Rule 2: If Line number availability is 'avail' in Table 11. The source variable and array variable at that line from Table 10 is compared with the source variable entry for the same line in Table 9. If both source variables are the same or if array variable present in Table 10 is same as source variable in Table 9, then the line number status is correct otherwise incorrect.

Rule 3: If Line number availability is 'NA' in Table 11, then Line number status will be NA i.e., not applicable.

Rule 4: A source code variable present in Table 10, if also present in Table 9 then source code variable availability in Table 11 is 'avail' else it is 'NA' i.e., non-available.

Rule 5: For every source code variable present in Table 11, if source code variable status is 'avail' and Table11.line number is same as Table9.Line number corresponding to same source code variable then source code variable status is 'correct'.

If in Table9, more than 1 HDL signals have the same source code variable, and if that source code variable is array with array index (i.e., if source code variable is in the form of source code variable[n], where n is index) then source code variable status is 'incorrect' for the same in Table 11. In all the rest cases, source code variable status is 'incorrect' in Table 11.

Rule 6: For every source code variable present in Table 11, if source code variable availability is 'NA' then source code variable status is 'NA' i.e., NOT applicable.

mult_func.value=0
if/else.value=0
precision_data.value=0

Step 16:

If the Line number availability is 'avail' and status is 'correct'→No further processing is required for this line.

If the Line number availability is 'avail' and status is 'incorrect'→Apply RULE 7 to suppress incorrect line numbers.

If the Line number availability is 'NA', status is 'NA' and precision_data.value=1→Apply RULE 8 to obtain the correct line numbers.

If the Line number availability is 'NA', status is 'NA' and precision_data.value=0→No further processing is required for this line as line number gets optimized. Reasons for line number optimization are:

a. Source code variable can be initialized at that line number.

b. Same computation is performed at any previous line numbers.

c. One variable is assigned to any other variable without any computation performed on former.

If the source code variable availability is 'avail' and status is 'correct'→No further processing is required for this source code variable.

If the source code variable availability is 'avail' and status is 'incorrect'→Apply RULE 9 to obtain the correct source code variables.

If the source code variable availability is 'NA' and status is 'NA'→Apply RULE 8 and RULE 10 to RULE 12 to obtain the correct source code variables.

Step 17:

Update the Table 9.line number and Table9.source code variables with correct line numbers and correct source code variables after applying appropriate rules.

TABLE 11 depicting status

| Line number | Line | Source code variable | Array variable | precision data type status | Multiplication status | Line number availability | Line number status | Source code variable availability | Source code variable status |
|---|---|---|---|---|---|---|---|---|---|
| 3 | Outer: for(i = 0; i < row_size; i++) { | i | NA | FALSE | FALSE | avail | correct | avail | correct |
| 4 | Middle: for(j = 0; j < col_size; j++) { | i | NA | FALSE | FALSE | avail | correct | avail | correct |
| 5 | i_col = i * col_size; | i_col | NA | FALSE | TRUE | avail | correct | avail | correct |

TABLE 9

| | | | | format | | | | |
|---|---|---|---|---|---|---|---|---|
| state_bind | HDL signal name | type (wire/ reg) | initial_name | Source code variable | operator | operands | predicate | Line number |

Step 18:

Check if pipelining is present in the design. For this check, parse the verbose binding report and search for Pipeline keyword. If the value of Pipeline is not equal to 0, pipeline is present in the design. If the value of Pipeline is 0, pipeline is not present in the design.

Step 19:

If pipeline is not present in the design: Extract the state variable to determine the state of execution at a particular clock cycle. The "AP_CS_FSM" HDL signal value is used for this. The "AP_CS_FSM" value is converted from hexadecimal to integer and take its antilog for every clock cycle. The state variable value is obtained by adding 1 to the antilog value. The state variable thus obtained is referred to as "AP_CS_FSM_st".

Step 20:

Parse the verbose binding report to link the states available (indicated as state_bind) in verbose binding report to the states obtained from "AP_CS_FSM". The states with equal values for state_bind and AP_CS_FSM_st are same. This information is presented in tabular format (Table 12)
AP_CS_FSM: state_bind

TABLE 12

| format and an example | |
|---|---|
| AP_CS_FSM_st | state_bind |
| 5 | 5 |

Step 21:

If pipelining is present in the design: Value of pipeline will be same as the number of 'for loops' in which pipelining pragma is applied. To link the timing information for HDL signals present in Table 3 with Table 9, follow the given steps:

Step 21.1:

Parse the verbose binding report to record the pipeline_name, initiation interval (II), states (state_bind) and create Table 13.

TABLE 13

| format and example | | |
|---|---|---|
| pipeline_name | Initiation_interval | state_bind |
| Pipeline-0 | 2 | 4 5 6 7 8 |

Step 21.2:

For each state_bind in each pipeline_name of Table 13, generate the pipeline_stage_hdl_signal and control_hdl_signal as shown in Table14 through given rules.

pipeline_stage_hdl_signal is captured in the form of pipeline stages that are derived from state_bind and initiation interval.

Total number of pipeline stages=Initiation interval, and Pipeline stages number varies from 0 to (Initiation interval−1). If pipelining is applied, only one pipeline stage can be active at any clock and, but multiple bind states can be active simultaneously at any clock.

STEP i—m starts from 0

STEP ii—pipeline_stage_hdl_signal for present state_bind=string concatenate ("ap_CS_fsm_pp"+ #pipeline_value+"_stage"+m).

STEP iii—if m is not equal to (initiation interval−1), increment m by 1.

STEP iv—if m is equal to (initiation interval−1), reset m to 0.

Repeat steps STEP ii, STEP iii, and STEP iv till all states in state_bind is exhausted.

control_hdl_signal is derived from state_bind and initiation interval.

# of Control signals vary from 0 to {ceil(n/2)−1} where n is the number of bind states (state_bind).

STEP a—k starts from 0.

STEP b—k remains constant till state_bind equal to initiation interval gets exhausted.

STEP c—Control signal for present state_bind=string concatenate ("ap_enable_reg_pp"+#(integer value in pipeline_name)+"_iter"+k).

STEP d—k gets incremented by 1.

STEP e: Repeat steps STEP b, STEP c and STEP d till all states in state_bind is exhausted.

Repeat steps STEP a, STEP b, STEP c, STEP d and STEP e for all pipelines.

TABLE 14

| format and an example | | | |
|---|---|---|---|
| pipeline_name | state_bind | pipeline_stage_hdl_signal | control_hdl_signal |
| Pipeline-0 | 4 | ap_CS_fsm_pp0_stage0 | ap_enable_reg_pp0_iter0 |
| Pipeline-0 | 5 | ap_CS_fsm_pp0_stage1 | ap_enable_reg_pp0_iter0 |
| Pipeline-0 | 6 | ap_CS_fsm_pp0_stage0 | ap_enable_reg_pp0_iter1 |
| Pipeline-0 | 7 | ap_CS_fsm_pp0_stage1 | ap_enable_reg_pp0_iter1 |
| Pipeline-0 | 8 | ap_CS_fsm_pp0_stage0 | ap_enable_reg_pp0_iter2 |

Step 22:

Start cycle by cycle processing of Table 3 obtained in STEP 7.

Fetch all HDL signals and their values sharing the same cycle #.

Entries from Table 3

| Clock cycle # | Module | Source code function | HDL signal name | HDL signal value |
|---|---|---|---|---|
| i | abc | abc_func | abc_hdl | abc_hdl_val |
| i | bcd | bcd_func | bcd_hdl | bcd_hdl_val |

Step 23:

(Link the timing information for HDL signals using Table 3, Table 9, and Table 12/Table14.)

From the set of all HDL signals of a particular clock cycle #, Check the "AP_CS_FSM_st" value for non-pipelined designs and "pipeline_stage_hdl_signal" and "control_hdl_signal" for pipelined designs.

Fetch the state_bind value from Table 12 for non-pipelined design. For pipelined design, fetch the state_bind value from Table 14 when pipeline stage hdl signal and control hdl signal are high at a clock cycle.

Fetch the HDL signal names for that state_bind value from Table 9.

Entries from Table 9

| state_bind | initial_name | operator | operands | predicate | Line number | HDL signal name | type (wire/reg) | Source code variable |
|---|---|---|---|---|---|---|---|---|
| 1 | abc_x | add | abc_op1, abc_op2 | abc_pred | abc_ln | abc_hdl | wire | abc_sc |

Step 24:

From all HDL signal fetched in STEP 22, retain signals that match HDL signals fetched for state_bind in STEP 23. Populate Line number, source code variable, type, and predicate entries for HDL signal from Table 9.

TABLE 15

| Clock cycle # | Module | Source code function | HDL signal name | HDL signal value | Line number | Source code variable | Type (wire/reg) | predicate |
|---|---|---|---|---|---|---|---|---|
| i | abc | abc_func | abc_hdl | abc_hdl_val | abc_ln | abc_sc | wire | abc_pred |

Step 25:

Check if retained HDL signal name is wire or reg in Table 15.

If wire, record signals under present state of execution.

If reg, record signals under next state of execution.

Step 26:

Check the predicate for an HDL signal names in Table 15.

If the predicate is true or evaluates true, retain the record, otherwise delete the record.

Step 27:

Rules to maintain correctness in profile in cycle by cycle behaviour of profile.

Check if/else.value obtained at STEP 14 is 1→Apply RULE 13, and

Check if mult_func.value obtained at STEP 14 is 1→Apply RULE 14, otherwise proceed to STEP 28.

Step 28:

Repeat STEP 25-27, for all HDL signals in state_bind.

Step 29:

Populate retained record in performance table (Table 16) with clock cycle #, Line number, source code variable and HDL signal value entries from Table 15.

TABLE 16 format

| Clock cycle # | Line number | Source code variable | HDL signal value |
|---|---|---|---|

Step 30:

Repeat STEP 22-STEP 29 to generate the entire performance profile in tabular format i.e., for all HDL signals for all states. Keep populating Table 16 for entire execution time.

Second Subset of Associative Rules (to Obtain Profile correctness):

Rule 7: For any line number if the Line number availability is 'avail' and status is 'incorrect'. These are the cases when line numbers other than line numbers present in Table 11 come up in Table 9. In such cases, unwanted line numbers from Table 9 are suppressed by deleting those line numbers from Table9.line number column.

Rule 8: For any line number/source code variable present in Table 11, if line number/source code variable availability is 'NA', status is 'NA' and precision_data.value=1 then the Line number/source code variable can be generated through code transformation parser (discussed in STEP R8.1-R8.6).

Code-Transformation Parser Steps:

Step R8.1:

If source code contains #ap_int.h or #ap_fixed.h, then replace the arbitrary precision datatype of all variables with converted data types based on Table 17:

TABLE 17

| Arbitrary precision Datatype | Converted data type |
|---|---|
| ap_uint<n> ; 0<n<=8 | unsigned char |
| ap_uint<n>; 8<n<=16 | unsigned short int |
| ap_uint<n> ;16<n<=32 | unsigned int |

TABLE 17-continued

| Arbitrary precision Datatype | Converted data type |
|---|---|
| ap_int<n> ; 0<n<=8 | char |
| ap_int<n>; 8<n<=16 | short int |
| ap_int<n> ; 16<n<=32 | int |
| ap_int<n> ;32<n<=64 | long |
| ap_ufixed<W,I>; 0<W<=32 | float |
| ap_ufixed<W,I>; 32<W<=64 | double |
| ap_fixed<W,I>; 0<W<=32 | float |
| ap_fixed<W,I>; 32<W<=64 | double |

Step R8.2:

After converting datatype of arbitrary precision datatype variables, synthesize the type-casted code using STEP 1 and 2.

Step R8.3:

Repeat steps STEP 8, 9, 10, 11, 12, 13 to generate Table 9 for type-casted code.

Update table 9 as Table 18 by removing state_bind, predicate, HDL signal name, type(wire/reg) columns from Table 9.

TABLE 18

| | | | | format | | |
|---|---|---|---|---|---|---|
| | initial_name | operator | operands | Line number | Source code variable | |

Generate Table18 for type-casted code and original-code.

Step R8.4:

Find all the missing line numbers of original code due to precision data types. Missing line numbers=line numbers obtained from Table 18 (after typecasting)–line numbers obtained from Table 18 (before typecasting i.e. Original code).

Step R8.5:

Merge Table 18 of type-casted code and original-code with keys operator and operands to create Table 19 with column Type-casted.initial_name, Type-casted.operator, Type-casted.operands, Type-casted.line_number, Type-casted.source_code_variable, Original-code.initial_name, Original-code.operator, Original-code.operands.

TABLE 19 format and an example.

| Type-casted code | | | | | Originalcode | | |
|---|---|---|---|---|---|---|---|
| Initial_name | operator | opernds | Line number | Source_code variable | Initial_name | operator | operands |
| sub_In23 | sub | triangle_3d_x2, triangle_3d_x0 | 23 | NA | ret29 | sub | triangle_3d_x2_V, triangle_3d_x0_V |

Step R8.6:

If (Type-casted.operator==Original-code.operator) and (Type-casted.operands==Original-code.operands), then Original-code.initial_name=Type-casted.initial_name.

Populate Type-casted.Line number and Type-casted.source_code variable name from Table 19 for Original-code.inital_name entry in Table 9.

Rule 9:

For any source code variable present in Table 11, if source code variable availability is 'avail', source code status is 'incorrect', and if it is due to multiple signals having same source code variable, and that variable is array with array index then correct source variable is generated through mux rule.

TABLE 11 of Example Source Code

| Line number | Source code line | precision type status data | Source code variable | Source code variable availability | Source code variable status |
|---|---|---|---|---|---|
| 101 | for(int i = 0; i < | FALSE | i | avail | correct |
| 102 | n_leaves; i++){ | FALSE | NA | NA | NA |
| 103 | | FALSE | value_leaf | avail | incorrect |
| 104 | if(activation_leaf[i]){ return value_leaf[i]; } | | | | |

Mux Rule Steps:

Step R9.1:

Create Table 20 with columns 'initial', 'operands', 'operation', 'line number' and 'source code variable'. Compare line number of incorrect source code variable present in Table 11 with the line number in Table 9, initials in Table 9 with same Line number and operation 'mux' will be stored as initials in Table 20 along with operands, operation, and line number of the same.

Rule 11:

There are cases when source code variable availability is 'NA' in Table 11, but they are same as initial_name in Table 9. Therefore, these initial names can be populated as source code variables in Table 9.

Rule 12:

If HDL signal names in Table 9 are in form of name+ '_d'/'_q'+port number then SC variable is same as name.
Ex.

TABLE 9 format and an example

| state_bind | initial_name | operator | operands | predicate | Line number | HDL signal name | Type (wire/reg) | Source code variable |
|---|---|---|---|---|---|---|---|---|
| 3 | value_leaf_V_0_13 | select | icmp_ln94_37, p_read_24, value_leaf_V_0_12 | true | 95 | value_leaf_V_0_13_fu_5361 | wire | value_leaf.V[0] |
| 3 | value_leaf_V_0_14 | select | icmp_ln94_43, p_read_23, value_leaf_V_0_13 | true | 95 | value_leaf_V_0_14_fu_5733 | wire | value_leaf.V[0] |
| 4 | sext_ln 95_1 | sext | value_leaf_V_0_14 | true | 95 | sext_ln 95_1_fu_6486 | wire | NA |
| 4 | tmp_36 | mux | sext_ln95_1, sext_ln95_2, sext_ln95_3, sext_ln95_4, sext_ln95_5, sext_ln95_6, sext_ln95_7, sext_ln95_8, select_ln102_5 | true | 103 | or_ln102_5_reg_7820 | reg | NA |

Step R9.2:

Compare Table11.Line number with Table20.Line number for 'incorrect' source code variable status present in Table 11. If both Table11.Line number==Table20.Line number, then assign source code variable present in Table 11 to all the operands in Table 20 who's initial has same line number. Assign array index of source code variable according to the position of operands except last operand.

Step R9.3:

Now compare Table9. Initial_name and Table20. Operands, if they are same then populate Table 20. Source code variables in Table 9 source code variable against same initials.

TABLE 20 format and an example

| initial | operands | operation | Source line number | code variable |
|---|---|---|---|---|
| tmp_36 | sext_ln95_1, | mux | 103 | value_leaf[0] |
|  | sext_ln95_2, |  |  | value_leaf[1] |
|  | sext_ln95_3, |  |  | value_leaf[2] |
|  | sext_ln95_4, |  |  | value_leaf[3] |
|  | sext_ln95_5, |  |  | value_leaf[4] |
|  | sext_ln95_6, |  |  | value_leaf[5] |
|  | sext_ln95_7, |  |  | value_leaf[6] |
|  | sext_ln95_8, |  |  | value_leaf[7] |
|  | select_ln102_5 |  |  |  |

Rule 10:

For any source code variable present in Table 11, if source code variable availability is 'NA', source code status is NA and multiplication status is TRUE, then the target signal on the same line number with 'bitconcatenate'/'ashr' operation in Table 9 will be assigned same source code variable.

SC variable name for signal name M1_q0 is M1

Rule 13:

If "if/else" present in source code then follow the below steps to maintain the correctness in dynamic performance profile.

Step R13.1:

Parse source code to store every 'if-else' condition line number present in source code in Table 21, It will store
  'if/elif' condition line no in 'if/elif' Ln_no column,
  the executed line numbers when 'if/elif' condition become true in 'if/elif then' Ln_no column,
  'else' condition line no in 'else' Ln_no column, and
  the executed line number when 'else' condition become true in 'else then' Ln_no column.
  If there is no 'else' condition for any 'if' condition, then 'NA' i.e., not available is stored in 'else' Ln_no and 'else then' Ln_no.
  If there is no 'if/elif' condition in source code i.e., if/else.value==0 then keep Table 21 empty.

TABLE 21 format and an example

| 'if/elif'Ln_no | 'if/elif then'Ln_no | 'else'Ln_no | 'else then'Ln_no |
|---|---|---|---|
| 4 | 5 | NA | NA |
| 6 | 7 | 8 | 9, 10, 11, 12 |
| 10 | 11 | 12 | 12 |

Step R13.2:

If Table 21 is not empty, then compare Table21. 'if/elif' Ln_no with Table9.line number and find the equivalent signal of every 'if/else' comparison and record the same in Table22.

'if/elif' Ln_no: Equivalent signal

TABLE 22

| format and an example | |
|---|---|
| 'if/elif' Ln_no | Equivalent signal |
| 4 | icmp_ln4 |
| 6 | icmp_ln6 |
| 10 | xor_ln10 |

Equivalent signal for every comparison can be found by given below ways:
 a. Compare Table 21. 'if/elif' Ln_no.values with Table9.line number, if both are equal and Table9.operation.value is 'br' and operand is other than 'void', then the operand will be the equivalent comparison signal.
 b. For every 'if/elif' Ln_no in Table 21, find the initial_name whose operation is same as 'icmp'/'xor'/'and'/'or'. If there are multiple initials with same operation, then select the target initial (i.e., last occurring initial) as equivalent comparison signal.
 c. If there is no line number in Table 9 for any Table21.'if/elif' Ln_no.value then compare the Table21. 'if/elif then' Ln_no.value with Table 9.line number.values. For same line numbers, do the 'and' operation of every corresponding predicate signal and the resultant will be equivalent comparison signal.

Step R13.3:
 After finding the equivalent comparison signal of every 'if/elif' condition in Table22, if comparison signal is true at any clock in Table 15, then generate the 'if/elif then' Ln_no and suppress the 'else then' Ln no at that clock. If 'if/elif' comparison signal is low at any clock, then suppress the 'if/elif then' Ln_no at that clock.

Rule 14:
 If mult_func.value=1.
 Follow below steps to maintain accuracy.

Step R14.1:
 For every source code function in Table 2, check the transition of HDL signal (#Module Name+ap_start) throughout the execution in Table 15.

Step R14.2:
 If HDL signal (#Module+ap_start) is low at any clock for source code function, then source code function is inactive at that clock. At that clock, all HDL signals in Table15.HDL_signal_name which has same inactive source code function in Table15.source_code_function belong to inactive function. All the column entries for HDL signals corresponding to inactive function are deleted at that clock from Table 15.

TABLE 15

| Clock cycle # | Module | Source code function | HDL signal name | HDL signal value | Line number | Source code variable | Type (wire/reg) | predicate |
|---|---|---|---|---|---|---|---|---|
| i | abc | abc_func | abc_hdl | abc_hdl_val | abc_ln | abc_sc | wire | abc_pred |

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The method disclosed provides intrusive profiling of high-level synthesis HLS based applications with a cycle-accurate, fine-grained performance profiling framework that is non-intrusive and provides an end-to-end profile of the design. Such profiling tool can help the designer/DSE tool to quickly identify the performance bottlenecks and have a guided approach towards tuning it.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for non-intrusive profiling of High-Level Synthesis (HLS) applications, the method comprising:
   synthesizing a design for a source code for an HLS based application executed on a Field Programmable Gate Arrays (FPGA), by one or more hardware processors, using an HLS compiler, in accordance with a synthesis time period, wherein the design is specified by the HLS compiler in terms of a plurality of hardware description language (HDL) files, a synthesis report, a verbose binding report and a plurality of database files, wherein the HLS compiler converts the source code of the HLS based application developed in a high-level language to a low-level HDL implementation using steps of scheduling, binding, and control extraction, and wherein logic operations of the source code are distributed through a clock cycles of the FPGA in scheduling and a number of the logic operations depends on a clock frequency, optimization directives and a technology library of the FPGA, and the binding assigns hardware resources of the FPGA for carrying out the logic operation which are scheduled using a state machine by the step of control extraction;
   co-simulating the design of the plurality of HDL files, by the one or more hardware processors using a co-simulator, based on a test bench identified for the source code to generate a Value Change Dump (VCD) file comprising a plurality of HDL signals in the plurality of HDL files cycle-by-cycle and a corresponding plurality of HDL signal values for an entire execution time at every time instant with a plurality of commands, wherein the co-simulation denotes dynamic behavior of the design depending on a run-time value of design variables, wherein a designer reviews generated waveform from co-simulation using a wave viewer to analyze temporal changes of the plurality of HDL signals captured in a form of the VCD file;
   extracting structured information, by the one or more hardware processors, using an HLS profiler by:
      (a) parsing the VCD file to generate a timing information for the plurality of HDL signals from the plurality of HDL files with the corresponding plurality of HDL signal values;
      (b) parsing the synthesis report to generate a plurality of module names to which the plurality of HDL signals belong and a corresponding plurality of source code functions;
      (c) parsing the verbose binding report to link an initial name to an HDL signal name for each of the plurality of HDL signals;
      (d) parsing the plurality of HDL files to obtain whether the HDL signal name, associated with each of the plurality of HDL signals, is one of a wire and a register;
      (e) parsing the source code to record a plurality of variables, a plurality of array variables, a precision data type status, and a multiplication status at a line number for each of a plurality of code lines of the source code; and
      (f) parsing the plurality of database files to link the initial name for each of the HDL signals to the plurality of variables in the source code;
   analyzing, by the one or more hardware processors, using the HLS profiler, the extracted structured information to form associations between every line of the source code to the clock cycle, wherein the HLS profiler analyzes the extracted structured information in accordance with one or more rules from a set of associative rules to define associations between the line number of the source code, the plurality of variables, the HDL signal name for each of the plurality of HDL signals and the corresponding plurality of HDL signal values providing visibility into cycle-by-cycle hardware execution of the source-code for entire HLS based application execution time to generate a performance profile table for the source code; and
   communicating the generated performance profile table for the source code with a developer to fine-tune the performance of the design of the source code using the HLS profiler by identifying performance bottlenecks, optimizing the performance bottlenecks, and updating the source code with a pragma directive.

2. The method of claim 1, wherein the set of associative rules are based on source code semantics, parsed output corresponding to the extracted structured information and HDL design semantics and enable suppress invalid transitions getting captured in standard HLS profiling, wherein a first subset of rules among the set of associative rules enable obtaining status at the line number level and a second subset of rules among set of associative rules enable obtaining profile correctness in the performance profile table.

3. The method of claim 1, wherein when a line number availability is 'avail' and status is 'correct', then no further processing is required for the corresponding line, when the line number availability is 'avail' and the status is 'incorrect', then apply a corresponding rule from the set of associative rules to suppress incorrect line numbers, when the line number availability is 'NA', the status is 'NA' and precision data value=1, then apply a corresponding rule from the set of associative rules to obtain correct line numbers, and when the line number availability is 'NA', the status is 'NA' and precision data value=0, then no further processing is required for the line as the line number gets optimized by initializing the source code variable at the line number, performing same computation at any previous line numbers and assigning one variable to any other variable without any computation is performed on the variable.

4. A system for non-intrusive profiling for High-Level Synthesis (HLS) based applications, the system comprising:
a memory storing instructions;
one or more Input/Output (I/O) interfaces; and
one or more hardware processors coupled to the memory via the one or more I/O interfaces, wherein the one or more hardware processors are configured by the instructions to:
synthesize a design for a source code for an HLS based application executed on a Field Programmable Gate Arrays (FPGA) using an HLS compiler, in accordance with a synthesis time period, wherein the design is specified by the HLS compiler in terms of a plurality of hardware description language (HDL) files, a synthesis report, a verbose binding report and a plurality of database files, wherein the HLS compiler converts the source code of the HLS based application developed in a high-level language to a low-level HDL implementation using steps of scheduling, binding, and control extraction, and wherein logic operations of the source code are distributed through a clock cycles of the FPGA in scheduling and a number of the logic operations depends on a clock frequency, optimization directives and a technology library of the FPGA, and the binding assigns hardware resources of the FPGA for carrying out the logic operation which are scheduled using a state machine by the step of control extraction;
co-simulate the design of the plurality of HDL files using a co-simulator, based on a test bench identified for the source code to generate a Value Change Dump (VCD) file comprising a plurality of HDL signals in the plurality of HDL files cycle-by-cycle and a corresponding plurality of HDL signal values for an entire execution time at every time instant with a plurality of commands, wherein the co-simulation denotes dynamic behavior of the design depending on a run-time value of design variables, wherein a designer reviews generated waveform from co-simulation using a wave viewer to analyze temporal changes of the plurality of HDL signals captured in a form of the VCD file;
extract structured information using an HLS profiler by:
(a) parsing the VCD file to generate a timing information for the plurality of HDL signals from the plurality of HDL files with the corresponding plurality of HDL signal values;
(b) parsing the synthesis report to generate a plurality of module names to which the plurality of HDL signals belong and a corresponding plurality of source code functions;
(c) parsing the verbose binding report to link an initial name to an HDL signal name for each of the plurality of HDL signals;
(d) parsing the plurality of HDL files to obtain whether the HDL signal name, associated with each of the plurality of HDL signals, is one of a wire and a register,
(e) parsing the source code to record a plurality of variables, a plurality of array variables, a precision data type status, and a multiplication status at a line number for each of a plurality of code lines of the source code; and
(f) parsing the plurality of database files to link the initial name for each of the HDL signals to the plurality of variables in the source code;
analyze using the HLS profiler, the extracted structured information to form associations between every line of the source code to the clock cycle, wherein the HLS profiler analyzes the extracted structured information in accordance with one or more rules from a set of associative rules to define associations between the line number of the source code, the plurality of variables, the HDL signal name for each of the plurality of HDL signals and the corresponding plurality of HDL signal values providing visibility into cycle-by-cycle hardware execution of the source-code for entire HLS based application execution time to generate a performance profile table for the source code; and
communicate the generated performance profile table for the source code with a developer to fine-tune the performance of the design of the source code using the HLS profiler by identifying performance bottlenecks, optimizing the performance bottlenecks, and updating the source code with a pragma directive.

5. The system of in claim 4, wherein the set of associative rules are based on source code semantics, parsed output corresponding to the extracted structured information and HDL design semantics, and enable suppress invalid transitions getting captured in standard HLS profiling, wherein a first subset of rules among the set of associative rules enable obtaining status at the line number level and a second subset of rules among set of associative rules enable obtaining profile correctness in the performance profile table.

6. One or more non-transitory machine-readable information storage mediums comprising one or more instructions which when executed by one or more hardware processors cause:
synthesizing a design for a source code for an HLS based application executed on a Field Programmable Gate Arrays (FPGA), by using an HLS compiler, in accordance with a synthesis time period, wherein the design is specified by the HLS compiler in terms of a plurality of hardware description language (HDL) files, a synthesis report, a verbose binding report and a plurality of database files, wherein the HLS compiler converts the source code of the HLS based application developed in a high-level language to a low-level HDL implementation using steps of scheduling, binding, and control extraction, and wherein logic operations of the source code are distributed through a clock cycles of the FPGA in scheduling and a number of the logic operations depends on a clock frequency, optimization directives and a technology library of the FPGA, and the binding assigns hardware resources of the FPGA for carrying out the logic operation which are scheduled using a state machine by the step of control extraction;
co-simulating the design of the plurality of HDL files, by using a co-simulator, based on a test bench identified for the source code to generate a Value Change Dump (VCD) file comprising a plurality of HDL signals in the plurality of HDL files cycle-by-cycle and a corresponding plurality of HDL signal values for an entire execution time at every time instant with a plurality of commands, wherein the co-simulation denotes dynamic behavior of the design depending on a run-time value of design variables, wherein a designer reviews generated waveform from co-simulation using a wave viewer to analyze temporal changes of the plurality of HDL signals captured in a form of the VCD file;

extracting structured information by using an HLS profiler by:
(a) parsing the VCD file to generate a timing information for the plurality of HDL signals from the plurality of HDL files with the corresponding plurality of HDL signal values;
(b) parsing the synthesis report to generate a plurality of module names to which the plurality of HDL signals belong and a corresponding plurality of source code functions;
(c) parsing the verbose binding report to link an initial name to an HDL signal name for each of the plurality of HDL signals;
(d) parsing the plurality of HDL files to obtain whether the HDL signal name, associated with each of the plurality of HDL signals, is one of a wire and a register;
(e) parsing the source code to record a plurality of variables, a plurality of array variables, a precision data type status, and a multiplication status at a line number for each of a plurality of code lines of the source code; and
(f) parsing the plurality of database files to link the initial name for each of the HDL signals to the plurality of variables in the source code;

analyzing, by using the HLS profiler, the extracted structured information to form associations between every line of the source code to the clock cycle, wherein the HLS profiler analyzes the extracted structured information in accordance with one or more rules from a set of associative rules to define associations between the line number of the source code, the plurality of variables, the HDL signal name for each of the plurality of HDL signals and the corresponding plurality of HDL signal values providing visibility into cycle-by-cycle hardware execution of the source-code for entire HLS based application execution time to generate a performance profile table for the source code; and communicating the generated performance profile table for the source code with a developer to fine-tune the performance of the design of the source code using the HLS profiler by identifying performance bottlenecks, optimizing the performance bottlenecks, and updating the source code with a pragma directive.

7. The one or more non-transitory machine-readable information storage mediums of claim 6, wherein the set of associative rules are based on source code semantics, parsed output corresponding to the extracted structured information and HDL design semantics and enable suppress invalid transitions getting captured in standard HLS profiling, wherein a first subset of rules among the set of associative rules enable obtaining status at the line number level and a second subset of rules among set of associative rules enable obtaining profile correctness in the performance profile table.

* * * * *